US006554940B2

(12) United States Patent
Otaki et al.

(10) Patent No.: US 6,554,940 B2
(45) Date of Patent: Apr. 29, 2003

(54) METHOD OF TRANSFERRING A PRINT PATTERN COMPOSED OF A FLUOROPOLYMER RESIN AND AN INORGANIC PIGMENT ONTO AN OBJECTIVE BODY USING LIQUID PRESSURE

(75) Inventors: Nobuyuki Otaki, Shimizu (JP); Kazuhiro Yamamoto, Shimizu (JP); Misao Sugiyama, Shimizu (JP)

(73) Assignee: Cubic Co., Ltd., Shizuoka-Ken (JP)

( * ) Notice: Subject to any disclaimer, the term of this patent is extended or adjusted under 35 U.S.C. 154(b) by 136 days.

(21) Appl. No.: 09/737,514

(22) Filed: Dec. 15, 2000

(65) Prior Publication Data

US 2001/0003611 A1 Jun. 14, 2001

Related U.S. Application Data

(62) Division of application No. 09/214,468, filed as application No. PCT/JP98/00824 on Feb. 27, 1998, now abandoned.

(30) Foreign Application Priority Data

Jun. 3, 1997 (JP) ........................................... 9-144850

(51) Int. Cl.$^{7}$ ......................... B44C 1/165; B32B 31/20; B41M 3/12; B05D 5/06; C09D 11/10

(52) U.S. Cl. ....................... 156/230; 156/236; 156/238; 156/247; 156/240; 156/277; 156/289; 427/149; 427/280; 427/430.1; 427/434.3; 428/42.1; 428/204; 428/207; 428/350; 428/500; 428/914; 106/31.13

(58) Field of Search ................................ 156/230, 235, 156/236, 238, 240, 247, 277, 289; 427/146, 147, 148, 149, 280, 430.1, 434.5; 428/195, 40.1, 42.1, 204, 207, 350, 914, 420, 500; 106/31.13, 31.25

(56) References Cited

U.S. PATENT DOCUMENTS

| | | | | | |
|---|---|---|---|---|---|
| 3,454,518 | A | | 7/1969 | Kelly ........................ | 260/31.4 |
| 3,760,724 | A | | 9/1973 | Budzinski et al. .......... | 104/526 |
| 4,231,829 | A | * | 11/1980 | Marui et al. ................ | 156/230 |
| 4,269,650 | A | * | 5/1981 | Arai et al. .................. | 156/540 |
| 4,436,571 | A | * | 3/1984 | Nakanishi ................... | 156/384 |
| 4,722,853 | A | | 2/1988 | Batliwalla ................... | 427/256 |
| 5,266,141 | A | * | 11/1993 | Seailles et al. ............. | 156/230 |
| 5,695,587 | A | * | 12/1997 | Dumoux ..................... | 156/230 |
| 5,908,525 | A | * | 6/1999 | Zaher ......................... | 156/230 |
| 6,022,438 | A | * | 2/2000 | Watanabe et al. ........... | 156/230 |
| 6,322,654 | B1 | * | 11/2001 | Walter et al. ............... | 156/230 |

FOREIGN PATENT DOCUMENTS

| | | | |
|---|---|---|---|
| JP | 8-238897 | 9/1996 | ........... B44C/1/175 |
| JP | 10-35195 | 2/1998 | |
| JP | 10-35196 | 2/1998 | |

* cited by examiner

*Primary Examiner*—J. A. Lorengo
(74) *Attorney, Agent, or Firm*—Pearne & Gordon LLP

(57) ABSTRACT

A pattern-transferring film having a print pattern provided on an upper surface thereof is floated on a liquid surface within a transferring bath and an objective body is immersed into a liquid within the transferring bath together with the pattern transferring film under a liquid pressure so as to transfer the print pattern onto the objective body. The print pattern is obtained by being printed by using an optional printing ink or inks of blue, yellow, red black and white inks or an ink or inks prepared by blending the printing inks. The liquid pressure pattern-transferring ink or inks comprise at least a resin ingredient and a color pigment. The resin ingredient of each of the color inks is composed of a fluoropolymer resin and the color pigment of each of the color inks is an inorganic pigment. In this manner, with liquid pressure pattern-transferring ink comprising the resin ingredient of the fluoropolymer resin and the inorganic pigment in spite of its color, all the color printing inks have a weather resistance of 5000 hours or more determined by a JIS based sunshine weather meter. Thus, there occurs no removal of the transferred pattern out of the objective body which tends to be caused by a deterioration of the resin ingredient, if otherwise and the color of the transferred pattern neither changes nor fades, which enables the article to have its life span maintained for a longer period.

8 Claims, 2 Drawing Sheets

METHOD OF TRANSFERRING A PRINT PATTERN COMPOSED OF A FLUOROPOLYMER RESIN AND AN INORGANIC PIGMENT ONTO AN OBJECTIVE BODY USING LIQUID PRESSURE

DESCRIPTION

This application is a division of application Ser. No. 09/214,468, filed Jan. 20, 1999, now abandoned, which is a 371 of PCT/JP98/00824, filed Feb. 27, 1998.

TECHNICAL FIELD

This invention pertains to a liquid pressure pattern-transferring ink useful for transferring and printing appropriate print patterns such as wood grain patterns, marble patterns or other patterns by using a liquid pressure on an objective article (a body to which the print pattern is to be transferred) having a three-dimensional surface such as a curved surface or the like. More particularly, this invention pertains to an improvement on a liquid pressure pattern-transferring ink which is suitably useful for printing the print patterns to be transferred on an outdoor objective article such as a car body, a guardrail, a fence, a gate, a bridge and so on which tends to be exposed to severe outdoor atmospheres such as sunlight, wind and rain and so on.

Furthermore, this invention pertains to a pattern-transferring film having a print pattern printed thereon by the liquid pressure pattern-transferring ink, a liquid pressure pattern-transferred article having a predetermined print pattern transferred from the pattern-transferring film by using a liquid pressure and a method of transferring a print pattern on an objective article by using the pattern-transferring film.

TECHNICAL BACKGROUND

A method of transferring onto an objective body or article (a body to which a print pattern is to be transferred) by using a liquid pressure a print pattern on a pattern-transferring film floated on a liquid surface has been used for printing the print pattern on the objective body having a three-dimensional surface such as a curved surface and so on. The liquid to be used may be typically water, but may be a liquid other than the water if it has no trouble for the liquid pressure pattern-transferring operation.

This liquid pressure pattern-transferring method is one in which a liquid-soluble or liquid-swelling pattern-transferring film having a predetermined print pattern of no liquid solution provided thereon is floated on a surface of a liquid flowing within a transferring bath and is made swelled by the liquid and then the objective body is immersed into the liquid within the transferring bath in a manner faced to the pattern-transferring film and has the print pattern transferred from the pattern-transferring film by using a liquid pressure.

In case that there should be printed a print pattern to be transferred on such an objective body as is used in a place such as a building room or a car room where it is never exposed to an outdoor atmosphere, a printing ink is not so much required to have a weather resistance.

Of late, a curved face printing art utilizing the liquid pressure pattern-transferring process has been required to be applied not only to inner articles to be placed within a car, but also to outer articles to be placed outside the car and furthermore to outdoor building materials or outdoor structures such as guardrails, gates, bridges and so on which are to be used for a longer period.

In case that there should be printed a print pattern to be transferred on such an objective body as is exposed to severe outdoor atmospheres such as wind and rain, sunlight and so on, the printing ink is required to have a weather resistance so that the color of the transferred pattern neither changes nor fades while it is exposed to the severe outdoor atmospheres for a longer period. In case that the articles such as the guardrails, the gates, the bridges or the likes on which the print pattern is to be transferred by the liquid pressure pattern-transferring process have a life span of ten and several years to several decades, the surface of the articles on which the print pattern is transferred under the liquid pressure is required to have the same life span as the articles.

In general, the printing ink for printing the print pattern on the pattern-transferring film to be used for the liquid pressure transferring process comprises a resin serving as a binder or a vehicle, a plasticizer serving to adjust a hardness of the resin, a pigment serving to provide a color thereto and a solvent serving to solve the resin into a liquid. The print pattern to be used for being transferred under a liquid pressure may be formed by a gravure printing method by using a single or a plurality of inks among yellow, red, blue, white and black inks while they are of a primary color or of a blended color so that a variety of colors appear where dots of the primary or blended color are superposed one on another.

A printing ink of prior art includes a resin having an alkyd resin as a fundamental component and also includes a relatively inexpensive pigment having a sharpness of its color. More particularly the prior art printing ink comprises a resin ingredient including a short-oil alkyd resin of 2 to 15 weight % and a nitrocellulose of 3 to 20 weight %, a plasticizer including a dibutyl phthalate of 2 to 7 weight %, a color pigment of 5 to 40 weight % and a solvent of the residue weight %. There is used a phthalocyanine blue as a blue pigment, an anatase type titanium white as a white pigment, a carbon black as a black pigment, a permanent red as a red pigment and a disazo yellow as a yellow pigment.

Such a prior art printing ink has no problem when it is used for printing the print pattern on the surface of the indoor objective body by the liquid pressure pattern transferring method, but it is confined that in case the prior art printing ink is used for printing the print pattern on the surface of the outdoor objective body exposed to the severe outdoor atmospheres such as sunlight, weather and so on for a longer period, the color of the print pattern transferred on the objective body and tentatively and continuously exposed to the severe atmospheres tends to change or fade. It is also confirmed that the transferred pattern loses the original good state or is removed out of the surface of the objective body under the same tentative condition.

Imagining that the color of the transferred pattern changing or fading was caused by the properties of the pigment in itself of the printing ink, the applicant made a weather resistance test on various metal test pieces having the printing inks of various colors daubed by using a sunshine weather meter based on JIS (Japanese Industrial Standard) so as to confirm the weather resistance (weather resistance hours) of the pigments included in the prior art printing inks. As a result, it was confirmed that the colors of the phthalocyanine blue as the blue pigment and the anatase type titanium white as the white pigment neither changed nor faded even in more than 3000 hours and the color of the carbon black as the black pigment neither changed nor faded even in more than 5000 hours, but the colors of the permanent red as the red pigment and the disazo yellow as the yellow pigment changed or faded in about 1000 and 500 hours, respectively. Thus, it will be noted that the color of the pattern transferred from the print pattern on the pattern transferring film formed by using the prior art printing ink changed or faded because the pigments had a poor weather resistance.

It is presumed that it is caused by lowering the function of the resin ingredient to disperse the pigment in the printing ink when time elapses that the actual transferred pattern provided by using the prior art printing ink loses its original good state.

As previously described, the transferred pattern on the outdoor objective article (body) such as the car outer article, the building material, the structure and so on is required to have a weather resistance of ten and several years to several decades corresponding to the life span of the outdoor article. It corresponds to the weather resistance of about 5000 hours determined by the weather resistance test using the sunshine weather meter based on JIS (Japanese Industrial Standards).

However, with the prior art printing ink used, the entire color of the transferred pattern is unbalanced due to the lower weather resistance of the red and yellow printing inks prior to the life span of the article and as a result, the color of the transferred pattern on the outdoor objective article tends to change or fade. Furthermore, the transferred pattern disadavantageously changes from the original good state so that the transferred pattern has the appearance deteriorated or is removed out of the objective article.

Such a liquid pressure pattern-transferred article sometimes has an undercoat provided before the print pattern is transferred under the liquid pressure or an overcoat provided thereafter. In this case, both of the undercoat and the overcoat are required to have the weather resistance identical to that of the transferred pattern.

Furthermore, the structure such as the guardrail or the bridge is required to have a decorative layer applied thereto. The structure has a surface area extremely larger than those of the indoor article and the outdoor article such as the car outdoor article. Thus, a larger amount of paint (varnish) or ink will be required for applying the decorative layer onto the structure, which prevents the decorative layer from being economically produced thereon.

Accordingly, it is an object of the invention to effectively transfer a print pattern under a liquid pressure onto an outdoor objective body while a transferred pattern printed on the objective body has a weather resistance of at least about 5000 hours on measurement by a sunshine weather meter based on JIS (referred to as a weather resistance of about 5000 hours hereinbelow).

It is another object of the invention to prevent a transferred pattern printed on an objective body from being deteriorated even after a long period elapses and from being removed out of the surface of the pattern transferred body so that the original good state of the transferred pattern can be maintained for a longer period.

It is further object of the invention to apply a decorative layer of higher weather resistance onto a structure such as a guardrail, a bridge and so on by using a possibly lower amount of paint or ink.

The present invention is to provide a liquid pressure pattern-transferring ink adapted to accomplish the aforementioned objects, a liquid pressure pattern-transferring film having a print pattern printed by the liquid pressure pattern-transferring ink, a liquid pressure pattern-transferred article having a transferred pattern obtained by using the liquid pressure pattern-transferring film and a method of producing the liquid pressure pattern-transferred article.

DISCLOSURE OF THE INVENTION

A first feature of the invention is to provide a liquid pressure pattern-transferring ink comprising a resin ingredient and a color pigment, said resin ingredient being composed of a fluoropolymer resin and said color pigment being an inorganic pigment.

A second feature of the invention is to provide a liquid pressure pattern-transferring film having a liquid soluble or liquid swelling base film and a print pattern printed on said base film, said print pattern being printed by using a liquid pressure pattern-transferring ink comprising a resin ingredient and a color pigment, said resin ingredient being composed of a fluoropolymer resin and said color pigment being an inorganic pigment.

A third feature of the invention is to provide a liquid pressure pattern-transferred article formed by transferring a print pattern from a pattern-transferring film to an objective body by using a liquid pressure, said print pattern being printed by using a liquid pressure pattern-transferring ink comprising a resin ingredient and a color pigment, said resin ingredient being composed of a fluoropolymer resin and said color pigment being an inorganic pigment.

A fourth feature of the invention is to provide a method of transferring a print pattern from a pattern-transferring film to an objective body by using a liquid pressure, said print pattern being printed by using a liquid pressure pattern-transferring ink comprising a resin ingredient and a color pigment, said resin ingredient being composed of a fluoropolymer resin and said color pigment being an inorganic pigment.

A fifth feature of the invention is to provide a method of transferring a print pattern from a pattern-transferring film to an objective body by using a liquid pressure, said print pattern being printed by using a liquid pressure pattern-transferring ink comprising a resin ingredient and a color pigment, said resin ingredient being composed of a fluoropolymer resin and said color pigment being an inorganic pigment.

In the first through fifth features of the invention, the fluoropolymer resin may be preferably a vinylidene fluoride, but it may be a vinyl fluoride resin or a fluoroolefin copolymer. The color pigment for the yellow ink may be at least one selected from a group of an iron oxide, a titanium yellow and a lead chromate, the color pigment for the red ink may be at least one selected from a group of a rouge, an iron oxide and a lead molybdate, the color pigment for the blue ink may be at least one selected from a group of an iron blue, an ultramarine blue and a cobalt aluminate, the color pigment for the black ink may be at least one selected from a group of a carbon black and an iron oxide and the color pigment for the white ink may be at least one selected from a group of a titanium white, a white lead and a zinc white. The print pattern may have a design as a collective form of dots provided by a gravure printing method using one or a plurality of printing inks selected from the five color inks while they are maintained at its primary color or blended. For instance, the outdoor building material or the structure may have a designed decorative layer as a whole applied thereto by combining a ground color of the undercoat and the liquid pressure pattern-transferred layer transferred from the print pattern which is in turn printed on the film by using the printing ink of the single color. Materials for a fence and a gate may be examples of the building material while the guardrail and the bridge may be examples of the structure. It should be noted that, in the description, a term “a single color” means that it includes one of a plurality of medium colors obtained by blending a plurality of color inks as well as each color of black, white and three primary colors such as red, blue and yellow.

In the third through fifth features of the invention, a resin ingredient for one or both of the undercoat applied before the print pattern is transferred on the objective body and the overcoat applied thereafter may be preferably a fluoropolymer resin, which may be typically a vinylidene fluoride, similarly.

The fuluoropolymer resin which is the resin ingredient for the printing ink is never deteriorated even though it is exposed to severe outdoor atmospheres for a long period while the inorganic color pigment which is the color pigment for the printing ink has a weather resistance of more than 5000 hours determined by a JIS sunshine weather meter.

The print pattern on the pattern transferring film used for the general liquid pressure pattern-transferring operation is obtained by forming a design as a collective form of dots on the pattern-transferring film by a gravure printing method using one or all of the five color printing inks or the blended inks obtained by blending these color printing inks. Since the liquid pressure pattern-transferring ink comprises the resin ingredient of the fluoropolymer resin and the inorganic color pigment even though it is of any color, the printing inks of all colors have the weather resistance of 5000 hours or more. Thus, the resin ingredient is never deteriorated while the color of the transferred pattern layer obtained by the single color printing ink neither changes nor fades and furthermore the color of the transferred pattern layer of the collective dots obtained by a plurality of color printing inks neither changes nor fades, which is caused due an unbalance of the weather resistance of the printing inks, if otherwise. This enables the transferred pattern layers to have the weather resistance of 5000 hours or more.

Since one or both of the overcoat and the undercoat applied on or under the transferred pattern layer include the fluoropolymer resin, their weather resistance is improved and enables to provide a baking finish therefor and in addition thereto the three layers of the undercoat, the transferred pattern layer and the overcoat have an adhesive property improved by the fluoropolymer resin included in the transferred pattern layer.

BEST MODE FOR EMBODYING THE INVENTION

Figure 1:
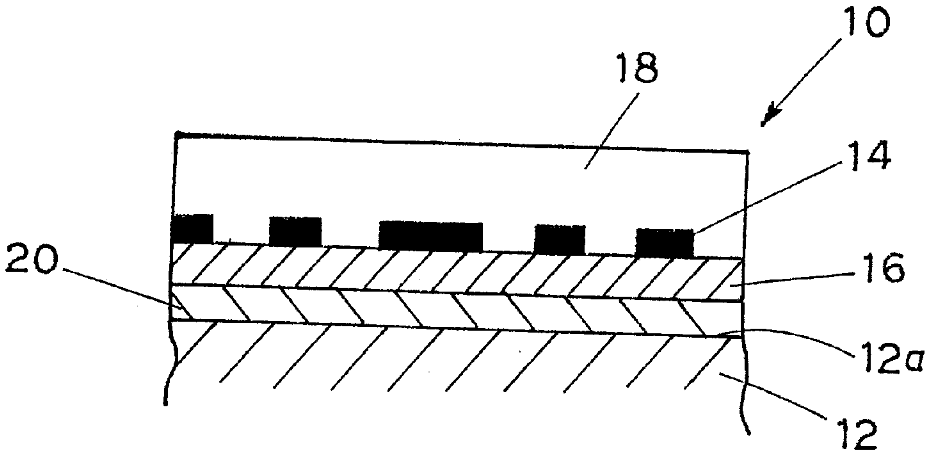
FIG. 1 is an enlarged cross sectional view of an example of a liquid pressure pattern-transferred article of the invention.

A fundamental method of transferring a print pattern under a liquid pressure by using a liquid pressure pattern-transferring ink of the invention is substantially identical to the prior art method as illustrated and described in U.S. Pat. Nos. 4,010,057 and 4,436,571, but a brief description of the method as described in the U.S. Pat. No. 4,436,571 will be made hereinjustbelow.

A pattern-transferring film to be used for the liquid pressure pattern transferring method can be produced by printing a print pattern such as a wood grain pattern or a marble pattern on a liquid soluble or liquid swelling base film of polyvinyl alcohol resin by a gravure printing method or other method using the printing ink of the invention. This pattern-transferring film is stored as a pattern-transferring film supply by being wound into a roll or making a bundle of sheets after dried.

In case the print pattern on the pattern-transferring film is transferred onto an objective body, a series of pattern-transferring film or every sheet of pattern-transferring film is drawn out from the pattern-transferring film supply before it is supplied into a transferring bath and passes through a coating means such as a roll coater where it is treated by an activator which is coated onto the print pattern on the pattern-transferring film.

The activator to be used for the treatment serves to restore the printing ink from the dry state to the swelling state so that the print pattern has a state of adhesive property as if it is just after it is printed. In case the objective body has a primary coat or undercoat, the activator preferably includes such a component as never rapidly dissolves a layer of the primer coat and has an affinity with a solvent of the primer coat.

The pattern-transferring film having the print pattern thus treated by the activator is supplied onto a liquid surface within the transferring bath by a suitable film supplying means while the print pattern is upwardly faced. The base film of the pattern-transferring film is swelled and softened by a liquid within the transferring bath which may be typically a water. Meanwhile, the print pattern on the pattern-transferring film is restored to the state of being fully swelled so as to be able to be transferred because it is treated by the activator before it reaches a transferring area within the transferring bath.

A conveying means serves to convey the objective body so as to partially or entirely immerse it into the liquid together with the transferring film while engaging the transferring film which is located at the transferring area within the transferring bath. Thus, the print pattern is transferred and closely adhered to a surface of the objective body under a liquid pressure which occurs when the objective body is immersed into the liquid. The print pattern can be closely adhered to and along the curved or complicated rough surface of the objective body in accordance with the extensibility of the ink.

The conveying means to convey the objective body withdraws up the objective body onto which the print pattern is attached out of the liquid surface and then conveys the resultant pattern transferred body to a surface treatment room. Within the surface treatment room is showered a hot water onto the pattern transferred body to wash out the remaining portion of the base film of the transferring film. Thereafter, within the surface treatment room is blown a hot air onto the pattern transferred body so that the solvent included in the ink and the activator is evaporated. An over coat may be provided onto the pattern transferred body, if necessary.

The objective body should be conveyed in such a pose that an air never enters between the objective body and the transferring film when it is immersed into the liquid within the transferring bath. The liquid within the transferring bath has a flow of given velocity so that the transferring film is moved to the transferring area at the given velocity and the objective body is immersed into the liquid at the velocity corresponding to that of the transferring film.

As described in the U.S. Pat. No. 4,010,057 specification, the pattern transferring film may be used for transferring the print pattern under a liquid pressure by being supplied to the transferring bath before being made dry after the print pattern is printed. In this case, treating the transferring film by the activator is not required. As disclosed in the U.S. patent specification, the pattern-transferring film may be fed to the step of transferring the print pattern after the film is cut into ones of predetermined length, but may be fed thereto in a serial form without being cut. In the latter case, as the pattern transferred body is drawn up out of the water after the print pattern is transferred, the succeeding pattern-transferring film in the swelled state will be forcefully cut away from the pattern transferred body.

A fundamental feature of the pattern-transferring ink of the invention is to comprise a resin ingredient composed of a fluoropolymer resin and a color pigment which is an inorganic pigment in spite of its color. The pattern-transferring ink may include a proper additive such as a plasticizer or other and a solvent to dissolve the ink ingredients in addition thereto.

The fluoropolymer resin which is the resin ingredient may be preferably a vinylidene fluoride, but it may be a vinyl fluoride resin or a fluoroolefin copolymer.

The ink of each color may include the following particular inorganic color pigment described hereinbelow. The yellow ink has at least one selected from a group of an iron oxide, a titanium yellow and a lead chromate, the red ink has at least one selected from a group of a rouge, an iron oxide and a lead molybdate, the blue ink has at least one selected from a group of an iron blue, an ultramarine blue and a cobalt aluminate. The black ink has at least one selected from a group of a carbon black and an iron oxide and the white ink has at least one selected from a group of a titanium white, a white lead and a zinc white. These color pigments may further have a metal powder pigment such as an aluminum powder, a pearl mica, a brass and so on added thereto in order to provide a different decorative effect thereto.

The plasticizer may be a dibutyl phthalate, a dioctyl phthalate or other proper component.

The solvent may be a toluene, a xylene, an ethyl acetate, an acetone or the like.

These ink ingredients may have a content properly set in consideration of hardness or softness, hue, coloring and concentration and so on.

The print pattern on the pattern-transferring film is obtained by forming a design as a collective form of dots by a gravure printing method using one or all of the five color printing inks as they are a primary color or blended with each other.

For instance, although there are generally used inks of at least three primary colors of blue, yellow and red or inks prepared by blending them with each other in order to form by the gravure printing method a print pattern on a base film to be transferred on the objective body, there may be additionally used a black ink for the print pattern in order to express the original black which cannot appear with these three primary colors and also a white ink therefor in order to express the white color which cannot appear with the blend of the three primary colors.

As previously described, an outdoor article which is to be used for a longer period while it is exposed to the severe outdoor atmospheres can be given no weather resistance corresponding to the life span of itself unless all the printing inks to be used for printing the print pattern have a predetermined weather resistance because the transferred pattern is unbalanced in its color tone, if otherwise.

It will be understood that since all the printing inks having the color pigments of the aforementioned colors have the weather resistance of 5000 hours or more determined by the sunshine weather meter based on JIS, the print pattern printed by these inks and transferred onto the objective body has the weather resistance of ten and several years through several decades in case of both of the single color and the combination of the optional colors.

Some examples of a sample obtained by using the liquid pressure pattern-transferring ink of the invention will be described hereinjustbelow. In these examples, there is separately formed the sample of every color having a transferred layer obtained by transferring on an aluminum test piece under a water pressure an ink layer on a transferring film which is in turn provided by daubing one of inks of three primer colors, white and black on a base film.

Table 1 shows the specific ratio of ingredients of the printing ink used for obtaining the sample according to the example of the invention while Table 2 shows the specific ratio of the ingredients of the printing ink used for obtaining the prior art sample. The inorganic pigments in the Table 1 were selected from the groups of the aforementioned specific inorganic pigments for every color. The organic or inorganic pigments in the Table 2 were a disazo yellow for the yellow pigment, a permanent red for the red pigment and a phthalocyanine blue for the blue pigment (all of which were the organic pigment) and an anatase type titanium white for the white pigment and a carbon black for the black pigment (all of which were the inorganic pigments).

TABLE 1

| Ingredients of ink | (Weight %) |
|---|---|
| Vinylidene fluoride (resin ingredient) | 5 to 20 |
| Inorganic pigments (all colors) | 12 to 40 |
| Dioctyl phthalate (plasticizer) | 4 to 7 |
| Toluene (solvent) | residue |

TABLE 2

| Ingredients of ink | (Weight %) |
|---|---|
| Resin ingredient | |
| Short-oil alkyd resin | 2 to 15 |
| Nitrocellulose | 3 to 20 |
| Organic and inorganic pigments | 5 to 40 |
| Dioctyl phthalate (plasticizer) | 2 to 7 |
| Toluene (solvent) | residue |

A weather test was made by a sunshine weather meter based on JIS on these samples. This weather test was conducted by comparing two kinds of the sample visually or by a color difference meter and confirming when the samples change or fade in their color. One kind of the sample was a tested sample which was obtained by continuously irradiating a light from a xenon lamp to the sample during every 25 minutes of one cycle and showering a water during the first 5 minutes among the 25 minutes of one cycle, which was repeated for various test times. Another kind of the sample was a non-tested sample which had the transferred layer, which was obtained by transferring under a water pressure having the same colors as the aforementioned kind of the sample, but which was given no weather test. As a result, it was confirmed that the samples according to the examples of the invention neither changed nor faded in their colors and had no transferred ink layer removed out of the test pieces, but that, in the samples according to the prior art, the yellow transferred layer began to change and fade in its color in about 500 hours while the red transferred layer began to change and fade in its color in about 1000 hours and that both of them were observed to be removed out of the test pieces.

Accordingly, it will be presumed that the layers of the transferred pattern of the actual liquid pressure pattern-transferred article produced by using the pattern-transferring ink according to the invention will neither change nor fade in their colors and will be never removed out of the objective body even though they are either of a single color dot collective form or of a plural color dot collective form even after ten and several years through several decades elapse while they are exposed to the severe outdoor atmospheres.

An example of a pattern-transferred article of the invention is shown in FIG. 1. This pattern-transferred article 10 may be a metal product made of aluminum, stainless steel and so on, an inorganic product made of ceramics or the like or a plastic product made of various plastics, but in the illustrated embodiment, the article is shown to be an outdoor building material such as a gate or the like. An undercoat 16 is provided on an underside of a layer 14 of a transferred pattern while an overcoat 18 is provided on an upper face of the transferred pattern layer 14. The undercoat 16 may be provided through a primer coat 20 on a surface 12*a* of a body 12 of the liquid pressure pattern transferred article 10.

As previously described, the transferred pattern layer 14 is formed by transferring by the aforementioned liquid pressure transferring method a print pattern from a pattern-transferring film having the print pattern printed by using a pattern-transferring ink or inks of a single color or plural colors including a fluoropolymer resin and an inorganic pigment. The print pattern on the pattern-transferring film is fed to the liquid pressure pattern transferring step while it is activated by a predetermined activator.

In case the undercoat 16 and the overcoat 18 are applied to the article, these coats may be preferably formed by coating a paint including a resin ingredient of a fluoropolymer resin. The undercoat and/or the overcoat may be formed by baking them at a baking temperature of 220° C. or more in order to obtain its hard surface. The fluoropolymer resin may be a vinylidene fluoride as a preferable example, but may be a vinyl fluoride resin or a fluoroolefin copolymer, which is identical to that of the resin ingredient for the ink.

As the paint for the undercoat and the overcoat which is used in combination of the transferred pattern of the pattern-transferred article having the predetermined weather resistance includes the resin ingredient of the fluoropolymer resin, the coats may be able to be provided by baking so as to obtain its harder good surface. In addition thereto, since the transferred pattern between the coats has the layer of the ink including the fluoropolymer resin in the same manner, these three layers can have a higher adhesion to each other. Thus, it will be noted that the property of the pattern transferred article can be more improved together with the weather resistance of the fluoropolymer resin itself. As previously described, since the transferred pattern has the weather resistance of 5000 hours and more determined by the JIS sunshine weather meter, the life span of the thus obtained pattern-transferred article can be maintained at ten and several years through several decades.

Another embodiment of the pattern-transferred article and the liquid pressure pattern-transferring method will be described with reference to FIGS. 2 and 3 hereinafter. Different from the method of producing the liquid pressure pattern-transferred article of the aforementioned embodiment, in this embodiment is used a pattern-transferring film having a print pattern printed by using a pattern-transferring ink of a single color and the transferring operation is made by feeding the pattern-transferring film to the transferring step before it is dried in the same manner as described in the U.S. Pat. No. 4,010,057 specification.

Figure 2:
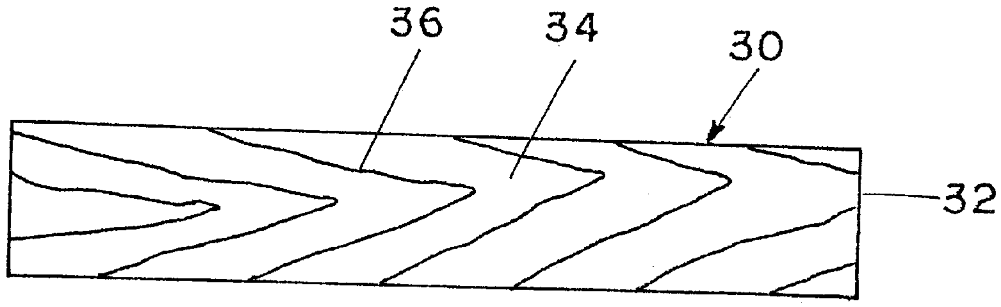
FIG. 2 is a top view of another example of a liquid pressure pattern-transferred article and FIG. 3 is a schematic diagram illustrating a method of producing the liquid pressure pattern-transferred article.

In FIG. 2 is shown a guardrail 30 as an example of the liquid pressure pattern-transferred article having the transferred pattern of the single color. The guardrail 30 has an undercoat 34 of brown color which is applied to a surface of a body of the guardrail made of metal such as steel so as to provide a ground color thereto and a transferred layer 36 of black wood grain applied on the undercoat 34 by the liquid pressure pattern-transferring method of the invention. A transparent topcoat may be provided on both of the undercoat 34 of the ground color and the transferred layer 36 of wood grain all over them, if necessary.

The wood grain pattern transferred layer 36 can be applied by using the liquid pressure pattern-transferring ink as previously described by means of the liquid pressure pattern-transferring method which will be described with reference to FIG. 3 hereinbelow.

The undercoat 34 and the topcoat may be preferably formed by using a paint including a resin ingredient of a fluoropolymer resin such as a vinylidene fluoride in the same manner as described with reference to FIG. 1.

In this manner, with the brown undercoat 34 provided on the surface of the body of the guardrail 30 so as to provide the ground color thereto and with the liquid pressure transferred layer 36 having only the single black color wood grain pattern provided on the undercoat 34, the combination of the undercoat 34 and the liquid pressure transferred layer 36 will provide to the guardrail 30 a decorative design layer having an appearance which is as if it is a genuine wood grain pattern when it is observed from far away. This allows the amount of the transferring ink used for the transferred layer 36 to be considerably lower than that in case the wood grain pattern is transferred to the surface of the guardrail body 32 all over it and therefore enables the guardrail having a vessel pattern to be inexpensively provided.

With such guardrails laid along roads, rivers and so on in mountain districts, rural districts or cities, for instance, they serve to economically provide a good view thereto because they give an appearance as if wooden guard rails are laid. Since the undercoat 34 and the liquid pressure transferred layer 36 have the higher weather resistance, the guardrails 30 can have a longer life span provided thereto.

Although, in the embodiment of FIG. 2, the liquid pressure pattern-transferred article is the guardrail, it may be an outdoor building material such as a fence, a gate and so on or the like or a structure such as a bridge and so on.

In the illustrated embodiment, although the wood grain pattern was printed by the black ink, it may be printed by a dark brown ink prepared by properly blending inks of various colors.

Now, there will be described a method of applying the liquid pressure pattern-transferred layer 36 to the guardrail 30 of FIG. 2 by using a transferring equipment 40 of FIG. 3. The transferring equipment 40 comprises a pattern printing section 44 to print a wood grain pattern on a base film of a pattern-transferring film 42 and a liquid pressure pattern-transferring section 46 to form the liquid pressure pattern-transferred layer 36 by transferring the wood grain pattern to the guardrail 30 while the thus obtained pattern-transferring film 42 is fed thereto before the ink of the wood gain pattern thereon is dried.

The pattern printing section 44 may comprise a block roller 48 to make an appearance of the wood grain pattern obtained by a photomechanical process and a printing roller 50 which may be made of a polyurethane to engage the block roller 48 so that the wood grain pattern is transferred from the block roller 48 to the printing roller 50. A liquid pressure pattern-transferring ink is fed to the block roller 48 from ink rollers 52 and 54 which serve to supply the ink. Between the printing roller 50 and a pressurizing roller 56 passes the base film 42A of the transferring film 42 to which the wood grain pattern transferred from the block roller 48 is printed. Thus, it will be understood that the pattern printing section 44 is a kind of an offset printing system, but it may be of a gravure printing system. The ink to be used for printing the wood grain pattern is a black ink including a fluoropolymer resin ingredient and an inorganic pigment as described with reference to FIG. 2, and more particularly, it may be the black ink having the resin ingredient of the vinylidene fluoride and the black inorganic pigment of the carbon black, for instance. In case the wood grain pattern is to be printed by the dark brown ink, the printing ink may be obtained by blending the red, the yellow and the black at an appropriate ratio, for instance. It should be noted that these color inks should be one including a fluoropolymer resin such as a vinylidene fluoride and so on and a particular inorganic color pigment.

In the illustrated embodiment, the liquid pressure transferring section 46 is illustrated to be of a conveyor type, in which a plurality of the guardrails 30 are sequentially fed to the transferring area. This may be also effectively utilized in case the guardrails 30 are relatively shorter. In case the pattern should be transferred to the relatively longer guardrails 30 under a liquid pressure, there may be preferably employed a transferring operation of a batch system in which each of the guardrails 30 is immersed into a transferring bath having a stationary water in a gradually inclined manner from one end to the other end thereof.

The conveyor type liquid pressure transferring section 46 may comprise a transferring bath 58 through which a water is fed and an objective body conveyor 60 to sequentially supply the body 32 of the steel guardrails 30 to the transferring bath 58. Similarly, an undercoat is previously applied to the surface of the guardrail body 32 by using a brown paint having a resin ingredient of fluoropolymer resin as previously described with reference to FIG. 2.

Figure 3:
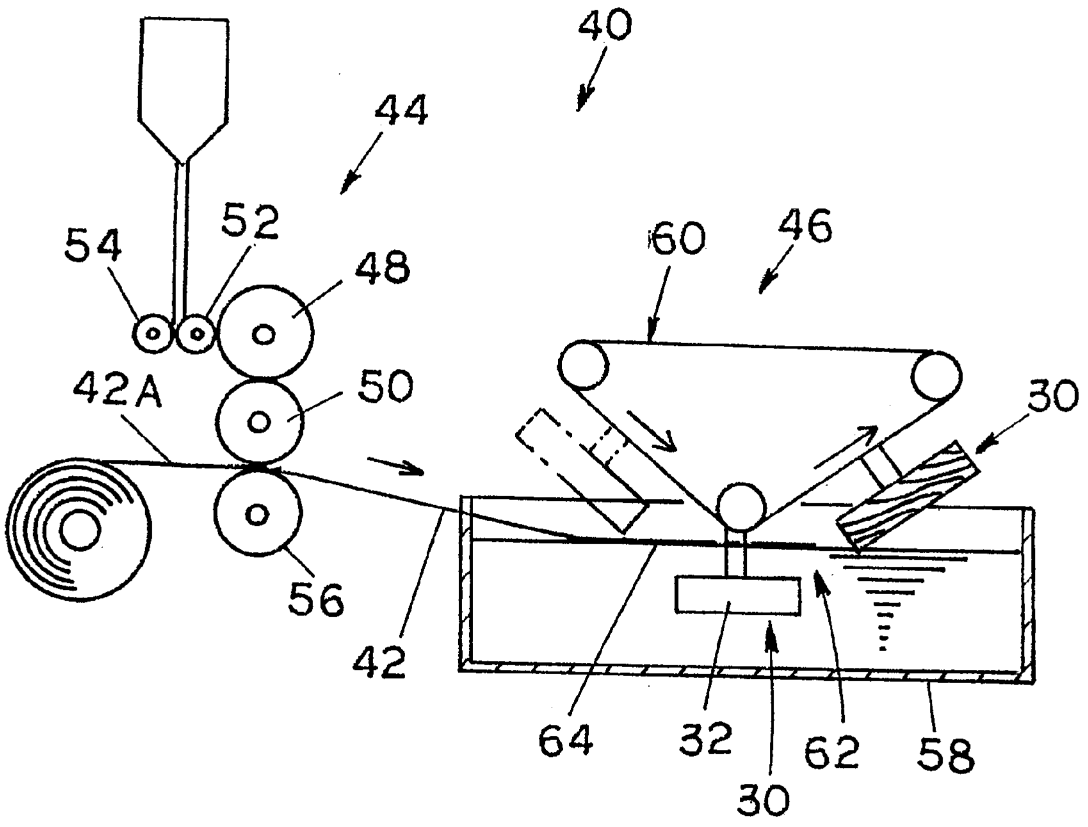

As shown in FIG. 3, the liquid pressure transferring film 42 formed by printing the wood grain pattern at the pattern printing section 44 is supplied to the water surface within the transferring bath 58 while the wood grain pattern is upwardly faced after the pattern is printed, but before it is dried and fed toward a transferring area 62 within the transferring bath 58. The transferring film 42 is moved by such a suitable means as gives a flow to the water within the transferring bath 58. Since the ink layer of the transferring film 42 is at the state of being swelled, it can be continuously fed to the transferring step without treating it by an activator.

As the transferring film 42 is supplied to the water surface 64, the base film 42A thereof is swelled by the water, but since the ink layer of wood grain pattern thereon is insoluble to the water, it is fed to the transferring area while it is slightly expanded in a longitudinal direction and in a lateral direction in accordance with the swelling of the base film 42A.

As shown in FIG. 3, the objective body conveyor 60 serves to sequentially immerse into the water within the transferring bath 58 at the transferring area 62 the guardrail bodies 32 having the brown undercoat previously applied thereto while the transferring film 42 is positioned under the surface of the guardrail bodies 32 and thereafter draw up the guardrail bodies 30 out of the water. By utilizing a water pressure occurring when the guardrail bodies 32 are immersed into the water, the ink layer of wood gain pattern on the transferring film 42 is closely adhered to the surface of the guardrail bodies 32 so that the wood grain pattern is transferred onto the surface of the guardrail bodies 32 to form the layer 14 of the transferred pattern (see FIG. 1). Out of the guardrail bodies 30 onto which the wood grain pattern is transferred and which is drawn up out of the water is removed the portion of the base film remaining on the guardrail bodies 30 by any suitable film removing means and then the topcoat may be applied thereto, if required. Thus, the steel guardrail 30 having the wood grain pattern applied as shown in FIG. 2 and having a good weather resistance can be produced.

In this process, following the printing step in which the print pattern (wood grain pattern) is printed on the transferring film 42, the print pattern is transferred on the guardrail bodies 32. This serial system of operation may be advantageously applied to a case in which the print pattern (wood grain pattern) of a single layer is printed on the transferring film. Of course, the serial system of operation may be applied to a case in which the print pattern of multi-color or multi-layer is printed on the transferring film, but since the multi-color printing and the multi-layer printing are somewhat harder than the single layer printing, in case there is used the transferring film having the print pattern obtained by the multi-color printing or the multi-layer printing, there is preferably employed a system in which the step of printing the print pattern and the step of transferring the print pattern are separately conducted as disclosed in the U.S. Pat. No. 4,436,571 specification.

UTILIZABILITY OF INDUSTRIES

In this manner, the invention is suitably applied for printing by a liquid pressure pattern-transferring method a pattern on a surface of an outdoor article or an outdoor structure exposed to severe outdoor atmospheres for ten and several years through several decades which are building materials such as guardrails, gates or the likes and structures such as bridges or the likes.

Furthermore, this invention is adapted to provide a liquid pressure transferring article having a transferred pattern provided through an undercoat on the body of the article and having an overcoat applied if required in which the transferred pattern has a weather resistance maintained at a life span of the article itself. Since the layer of the transferred pattern and the undercoat and/or the overcoat are closely adhered to each other, it may be applied to the outdoor article or the outdoor structure similarly.

Since the invention may apply the transferred layer such as wood grain pattern to a large-sized outdoor structure by combining an undercoat of ground color having a weather resistance with a transferred pattern of a printing ink having a weather resistance of ten and several years through several decades, a wooden-like structure can be economically produced while an amount of an expensive ink to be used is as low as possible.

What is claimed is:

1. A method of transferring a print pattern from a pattern-transferring film onto an objective body by using a liquid pressure, said print pattern being formed by being printed by using a liquid pressure pattern-transferring ink characterized by comprising a resin ingredient and a color pigment, said resin ingredient being composed of a fluoropolymer resin and said color pigment being an inorganic pigment and said print pattern which is on said pattern-transferring film being transferred under said liquid pressure to said objective body.

2. A method of transferring a print pattern from a pattern-transferring film onto an objective body by using a liquid pressure, said print pattern being formed by being printed by using a liquid pressure pattern-transferring ink characterized by comprising a resin ingredient and a color pigment, said resin ingredient being composed of a fluoropolymer resin and said color pigment being an inorganic pigment and said print pattern being transferred under said liquid pressure before said print pattern is dried on said pattern-transferring film.

3. A method of transferring a print pattern from a pattern-transferring film onto an objective body by using a liquid pressure, said print pattern being formed by being printed by using a liquid pressure pattern-transferring ink characterized by comprising a resin ingredient and a color pigment, said resin ingredient being composed of a fluoropolymer resin and said color pigment being an inorganic pigment and said print pattern which is dry on said pattern-transferring film being transferred under said liquid pressure after said print pattern is so treated as to be activated by an activator.

4. A method of transferring a print pattern from a pattern-transferring film to an objective body by using a liquid pressure, said print pattern being formed by being printed by using one of or a plurality of printing inks of a blue ink, a yellow ink, a red ink, a black ink and a white ink or an ink or inks prepared by blending said printing inks each characterized by comprising a resin ingredient and a color pigment, said resin ingredient being composed of vinylidene fluoride, said color pigment for said yellow ink being at least one selected from a group of iron oxide, a titanium yellow and a lead chromate, said color pigment for said red ink being at least once selected from a group of a rouge, an iron oxide and a lead molybdate, said color pigment for said blue ink being at least once selected from a group of an iron blue, an ultramarine blue and a cobalt aluminate, said color pigment for said black ink being at least one selected from a group of a carbon black and an iron oxide and said color pigment for said white ink being at least one selected from a group of a titanium white, a white lead and a zinc white and said print pattern which is on said pattern-transferring film being transferred under said liquid pressure to said objective body.

5. A method of transferring a print pattern from a pattern-transferring film to an objective body by using a liquid pressure, said print pattern being formed by being printed by using one or a plurality of printing inks of a blue ink, a yellow ink, a red ink, a black ink and a white ink or an ink or inks prepared by blending said printing inks each characterized by comprising a resin ingredient and a color pigment, said resin ingredient being composed of a vinylidene fluoride, said color pigment for said yellow ink being at least one selected from a group of an iron oxide, a titanium yellow and a lead chromate, said color pigment for said red ink being at least one selected from a group of a rouge, an iron oxide and a lead molybdate, said color pigment for said blue ink being at least one selected from a group of an iron blue, an ultramarine blue and a cobalt aluminate, said color pigment for said black ink being at least one selected from a group of a carbon black and an iron oxide and said color pigment for said white ink being at least one selected from a group of a titanium white, a white lead and a zinc white and said print pattern being transferred under said liquid pressure before said print pattern is dried on said pattern-transferring film.

6. A method of transferring a print pattern from a pattern-transferring film to an objective body by using a liquid pressure, said print pattern being formed by being printed by using one or a plurality of printing inks of a blue ink, a yellow ink, a red ink, a black ink and a white ink or an ink or inks prepared by blending said printing inks each characterized by comprising a resin ingredient and a color pigment, said resin ingredient being composed of a vinylidene fluoride, said color pigment for said yellow ink being at least one selected from a group of an iron oxide, a titanium yellow and a lead chromate, said color pigment for said red ink being at least one selected from a group of a rouge, an iron oxide and a lead molybdate, said color pigment for said blue ink being at least one selected from a group of an iron blue, an ultramarine blue and a cobalt aluminate, said color pigment for said black ink being at least one selected from a group of a carbon black and an iron oxide and said color pigment for said white ink being at least one selected from a group of a titanium white, a white lead and a zinc white and said print pattern which is dry on said pattern-transferring film being transferred under said liquid pressure after said print pattern is so treated as to be activated by an activator.

7. A method of transferring a print pattern onto an objective body comprising the steps of forming an undercoat on said objective body by a paint having a resin ingredient of a fluoropolymer resin to provide a ground color thereto and forming a liquid pressure pattern transferred layer of a single color pattern by transferring a print pattern of said single color pattern on said undercoat from a pattern-transferring film by using a liquid pressure so as to provide a predetermined decorative surface to said objective body in combination with said ground color, said print pattern being formed by a liquid pressure pattern-transferring ink comprising a resin ingredient of a fluoropolymer resin and an inorganic pigment.

8. A method of transferring a print pattern onto an objective body as set forth in claim 7, and wherein said resin ingredient of both of said paint and said liquid pressure pattern-transferring ink characterized by comprising a resin ingredient being composed of a vinylidene fluoride and said color pigment for a yellow ink being at least one selected from a group of an iron oxide, a titanium yellow and a lead chromate, said color pigment for a red ink being at least one selected from a group of a rouge, an iron oxide and a lead molybdate and said color pigment for a blue ink being at least one selected from a group of an iron blue, an ultramarine blue and a cobalt aluminate, said color pigment for a black ink being at least one selected from a group of a carbon black and an iron oxide and said color pigment for a white ink being at least one selected from a group of a titanium white, a white lead and a zinc white.

* * * * *